United States Patent [19]

Lang-Ree et al.

[11] 4,254,697
[45] Mar. 10, 1981

[54] BROILER WITH A PATTY FEED

[75] Inventors: Nils Lang-Ree, Los Altos; John S. Brown, Half Moon Bay; Edward D. Baker, San Francisco, all of Calif.

[73] Assignee: NPI Corporation, Burlingame, Calif.

[21] Appl. No.: 36,554

[22] Filed: May 4, 1979

Related U.S. Application Data

[63] Continuation of Ser. No. 877,338, Feb. 13, 1978, abandoned.

[51] Int. Cl.³ .................................................. A47J 37/00
[52] U.S. Cl. ...................................... 99/387; 99/391; 99/401; 99/443 C
[58] Field of Search .................. 126/41 C; 219/388 C, 219/347, 405; 99/386, 387, 389, 391, 443 C, 393, 401, 447, 339, 388

[56] References Cited

U.S. PATENT DOCUMENTS

| | | | |
|---|---|---|---|
| 1,530,387 | 3/1925 | Marra | 99/387 |
| 1,538,864 | 5/1925 | Morrison | 99/387 |
| 1,717,926 | 6/1929 | Horowitz | 99/387 |
| 2,151,401 | 3/1939 | Belcher | 99/387 |
| 2,238,309 | 4/1941 | Cramer | 99/386 |
| 2,917,990 | 12/1959 | Ehrenberg | 99/386 |
| 3,580,164 | 5/1971 | Baker | 99/386 |
| 4,023,007 | 5/1977 | Brown | 99/386 |
| 4,151,791 | 5/1979 | Baker | 99/386 |

*Primary Examiner*—Billy J. Wilhite
*Attorney, Agent, or Firm*—Lothrop & West

[57] ABSTRACT

A broiler especially for hamburger patties has an endless conveyor arranged on a frame with the horizontal upper run of the conveyor subjected to the usual supply of heat from above. A stack of initially frozen hamburger patties is arranged above the initial or entry portion of the conveyor upper run, all but the lower patty being confined. Extra heat is supplied from below to the spaced-apart metal rods of the conveyor upper run and to the lower patty lower surface so that the rods burn into the lower portion of the patty. Sufficient interengagement results so that the conveyor readily withdraws the lower patty from the stack.

1 Claim, 3 Drawing Figures

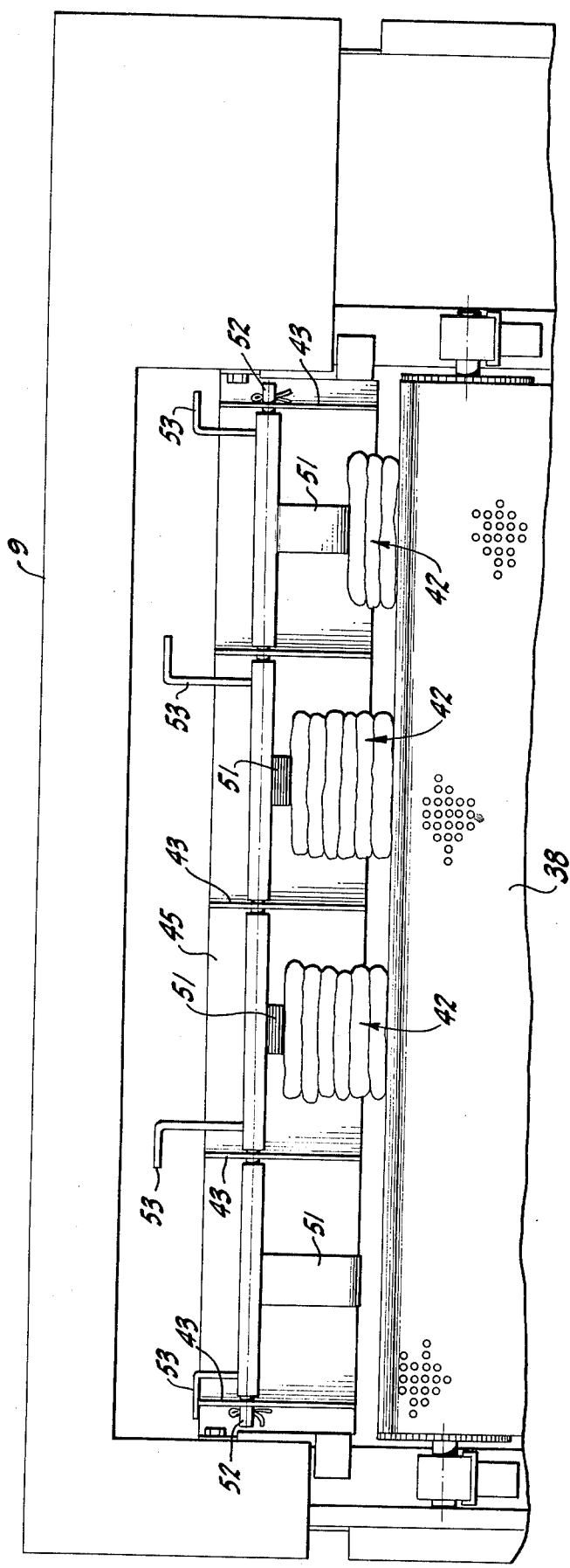
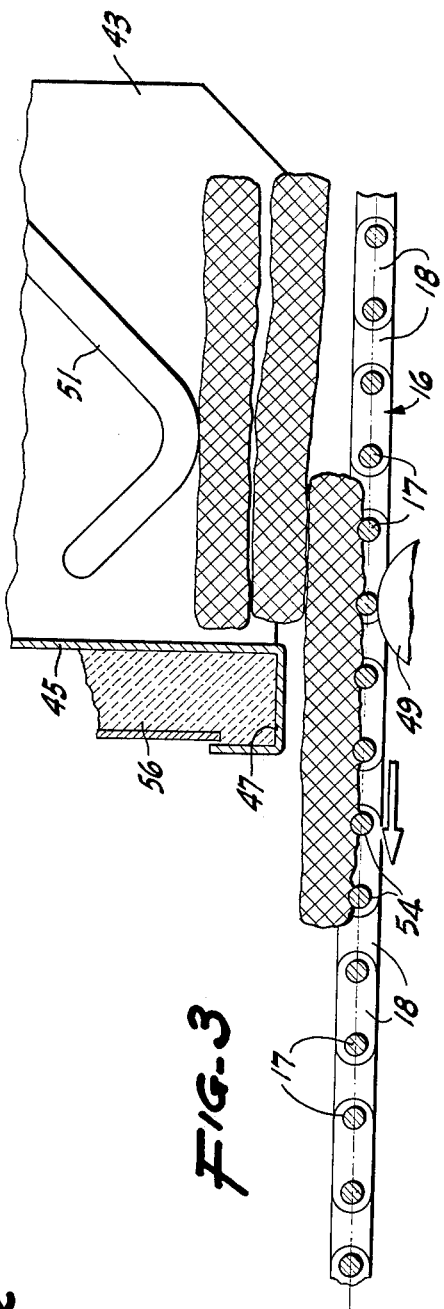

BROILER WITH A PATTY FEED

CROSS-REFERENCES TO RELATED APPLICATIONS

This is a continuation, of application Ser. No. 877,338, filed Feb. 13, 1978, now abandoned.

U.S. Application Ser. No. 883,929 filed Mar. 6, 1978 now Pat. No. 4,154,152 owned by a common assignee with this application discloses related subject matter.

BRIEF SUMMARY OF THE INVENTION

In the quantity cooking of initially frozen hamburger patties and the like in so-called "fast foods" establishments, it is customary to hand feed the hamburger patties to a broiler. Some broilers include patty conveyors. It has heretofore been difficult to afford an automatic patty feed, although such is desirable, largely because the patties as they are furnished come from frozen storage. They are not only relatively stiff and unyielding, but also sometimes have a coating of ice crystals, frozen particles and the like on their outer surface and are slippery. The present device is effective to condition an automatic feeding machine and the hamburger patties so that it is feasible to feed the patties automatically and individually to the conveyor for cooking.

BRIEF DESCRIPTION OF THE SEVERAL VIEWS OF THE DRAWINGS

FIG. 2 is an elevation, portions being broken away, of the upper portion of the feeder and broiler, the view being taken along the line 2—2 of FIG. 1.

FIG. 3 is an enlarged detail of a portion of the structure shown in FIG. 2, portions of the device being shown in cross-section on a vertical, longitudinal plane.

DETAILED DESCRIPTION

Figure 1:
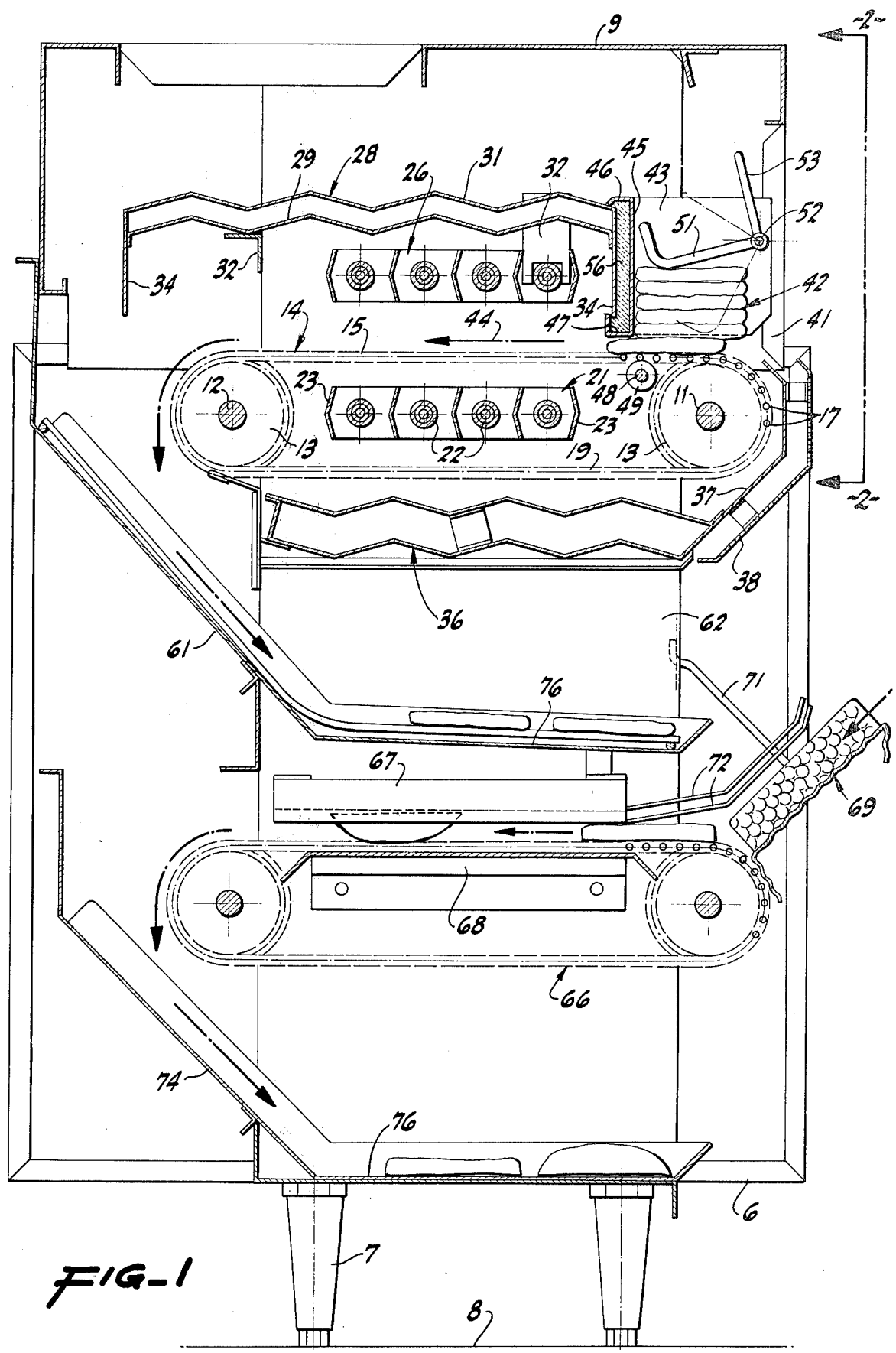
FIG. 1 is a cross-section on a vertical, longitudinal plane through a hamburger patty broiler constructed pursuant to the invention and especially disclosing, partially in cross-section and partially in elevation, a patty feeder pursuant to the invention.

The hamburger patty broiler pursuant to the invention includes an appropriate frame 6 of the customary sort mounted on legs 7 and resting on a floor 8. The frame is augmented by various cover sheets 9 to form a substantial enclosure. Within the upper portion of the enclosure and mounted on the frame are appropriately driven conveyor shafts 11 and 12, each carrying a pair of sprockets, such as 13, around which is trained an endless conveyor 14 arranged in the upper portion of the structure. The conveyor, as especially shown in FIG. 3, is preferably comprised not only of the usual side links or chains 16, but also includes a number of transversely disposed metal bars 17 of a relatively small diameter and of a good heat conducting material disposed with substantial openings 18 or spaces between the successive bars. Aluminum and stainless steel have been used for the bars. A convenient bar diameter is ⅛ inch.

Disposed between the upper run 15 and the lower run 19 of the upper conveyor 14 is a heating element 21. The element preferably includes a number of electrically energized glow rods 22 spaced apart in a generally horizontal array and provided with radiant shield plates 23 at the ends and similar intermediate shield plates, the entire unit being mounted on the frame.

In a somewhat similar fashion, there is a second heating element 26 disposed on the frame but above the upper run 15 of the conveyor belt. Disposed above the heating element 26 is a radiant heat reflector 28 preferably comprised of a lower dihedral plate 29 and an upper dihedral plate 31 suitably spaced apart and conveniently mounted on brackets 32 eventually connected to the frame. There are radiant reflectors 34 at either end of the unit 26.

Situated below the lower run 19 of the conveyor is a similar dihedral plate radiant energy reflector 36 arrayed in such a fashion as to support a forward and upward extension 37 likewise double walled but in this instance with the wall 38 on the exterior of perforated metal so as to radiate well and be relatively cool. The wall 38 stops at its upper end just below an opening 41 in the enclosure on the frame, the opening being extensive enough to allow easy manual access.

Particularly pursuant to the invention, there is provided on the frame and just within the opening 41 and immediately above the adjacent or initial portion of the conveyor upper run 15 a hamburger patty feeder. This device is designed to receive a plurality or column 42 of hamburger patties. In present practice, these patties are prepared well in advance and are then reserved for use in a freezer. There is a certain amount of moisture present, which solidifies, so that when the patties are first made available they are relatively stiff and often have very slippery, even hard, surfaces. They are difficult to handle automatically in that condition and are difficult to operate in any available feeder.

Pursuant to the invention, special feeders are provided. To that end, accessible through the opening 41 is a plurality of individual feeders, as shown in FIG. 2. These feeders are all substantially alike, so that a description of one applies to the others. Each feeder has a pair of vertical side walls 43 arranged to extend in a longitudinal plane the same as the directional arrow 44 (FIG. 1). The side walls 43 are spaced at intervals by an upstanding gauge wall 45 having a stiffening flange 46 at its upper edge and also having a gauge flange 47 at its lower edge. The height of the gauge flange 47 above the usual upper surface of the upper run 15 of the conveyor 14 is somewhat more than the normal vertical height or thickness of the usual hamburger patty. But that height is considerably less than the vertical height of a pair of such patties superposed.

To ensure that the height of the gauge opening between the flange 47 and the upper run 15 is closely maintained, there is provided a cross rod 48 mounted in the frame 6 and carrying spacing rollers 49 lying under and supporting the conveyor upper run 15.

Arranged to lie upon the uppermost patty in the stack 42 is a bent weight 51 extending from a shaft 52 suitably journalled in the plates 43 and conveniently having a handle 53 extending therefrom.

The arrangement, particularly of the heating element 21, is such that much of the radiant energy and also some of the convected energy therefrom rises between the walls 43 and is effective upon materials between them and upon the feed portion or initial portion (at the right end of FIG. 1) of the metal rods 17 of the upper run of the conveyor. Radiation from the adjacent heater 26 and through the walls 34 and 45 onto the patties is suppressed or reduced by thermal insulation 56 between the walls 34 and 45. The radiation particularly from the heater 21, especially the right-hand element thereof (as seen in FIG. 1), is effective to lift hot air and to transmit radiant energy through the openings 18 in the chain runs directly onto the lower surface of the lowermost patty in the stack.

In addition, since the metallic chain surrounds the element 21, all of the rods 17 become highly heated, particularly those that are emerging just beneath the initial patty in the layer. The amount of heat transmitted relative to the size of the rods and their advancement is substantial. Even though the lowermost patty is frozen and slick when it first impinges upon the rods, nevertheless there is sufficient heat transmitted to the lower surface of the patty, at least, as to melt any ice that might exist thereon and enough to start the cooking of the patty from the lower surface by contact with the relatively hot conveyor rods.

The cooking is sufficient under the weight of the pressed-down patty resting on the conveyor bars so that the patty surface meat tends to cook and set to form spaced transverse grooves 54 (FIG. 3). These extend slightly around the rods. The rods become partly embedded in the surface cooked patty material. The transverse, inverted grooves in the patty bottom in effect interengage with or "gear" with the conveyor bars or rods. There is no difficulty in extracting the lowermost patty from the stack by the conveyor advance.

In the present instance, the lowermost patty with adequate heat is always removed and as it travels ahead rides out from under the next superposed patty, as shown in FIG. 3, which in turn is then promptly defrosted on the bottom, and the cooking by the rods or bars and by the surrounding concentrated heat begins to form a corrugated or grooved bottom thereon for ready removal.

It is not desired to thaw the uppermost patties particularly, and especially is it not desired to thaw and soften their forward portions against the wall 45, so the insulation 56 is used to cut down heat flow in that area.

The cooked patties round off and drop from the upper conveyor run 15 and travel by gravity to the forward portion of the machine by a down ramp 61. The cooked patties are available at an access opening 62 on the same side of the machine as is the feed opening 41.

In many instances it is possible to utilize much of the heat within the machine casing to heat and maintain warm the bun halves that go with the hamburger patties. In this instance the framework supports a second conveyor 66 very much like the conveyor 14, except that the size and material of the cross bars are not nearly as critical. The conveyor 66 is appropriately driven, and its upper run travels below a heating platen 67 and over a supporting plate 68. The bun feed comprises a corrugated removable plate 69 held in place by a hook 71 interengaging with the machine frame and located adjacent a pair of radiant reflectors 72. Bun halves or heels and crowns put on the plate 69 at some distance from the relatively hot interior of the machine easily slide down by gravity over the corrugations since they have light plate contact. They then slide off the plate 69 and onto the upper run of the conveyor 66. The bun parts are then carried just beneath the platen 67 and over the supporting plate 68, being slightly pressed, warmed and browned as they travel. They finally discharge over the end of the bun conveyor 66 and travel by gravity down an inclined plate 74 to rest in a storage tray 76 for assembly with the patties available in a similar tray 77 in the upper portion of the machine.

With this arrangement, it has been found that much of the heat available within the machine is confined to the space within the enclosure, so that there is a relatively low energy usage. By applying some of the otherwise dissipated heat directly to the initial portion of the upper run 15 of the conveyor 14, and particularly upwardly against the bottom surface of the lower patty in the automatic feeder through the spaces between the chain, bars or rods, it is found that initially frozen patties can readily be thawed sufficiently and indented or thermally grooved sufficiently by the conveyor bars as to interengage therewith and to be positively pulled out from the bottom of the stack in order. An attendant with a minimum amount of attention can keep the various patty feeding stacks or magazines charged, so that there is very nearly a continuous output of cooked patties, as well as warmed bun halves, with a very small amount of operator attention and with substantially uniform results.

We claim:

1. A broiler with a patty-feed comprising a frame; a cover enclosure on said frame and including a top wall, side walls, a rear wall, and a front wall, said front wall having a feeding opening in the upper portion thereof, said feeding opening extending horizontally and vertically to the width and height of a stack of a plurality of hamburger patties, and said front wall having a discharging opening therein below said feeding opening; a vertical reflector wall and a vertical gauge wall extending transversely between said side walls and being substantially separated from each other to define an intermediate space, said gauge wall and a portion of said side walls defining a three-sided enclosure for and extending for more than the height of said stack of patties; an endless patty conveyor within said cover enclosure; means for supporting said conveyor on said frame with an upper run extending horizontally within said enclosure from a feed location adjacent said feeding opening, then beneath said gauge wall and said reflector wall to a discharge location spaced from said rear wall; means for advancing said upper run away from said feeding opening; a heating element on said frame above said upper run and disposed on the side of said gauge wall and said reflector wall opposite to said feeding opening; cooked patty conveyor means on said frame extending from just beneath said discharge location downwardly and forwardly toward said discharge opening; and thermal insulation occupying all of such intermediate space and lining all of one side of said three-sided patty stack enclosure.

* * * * *